United States Patent
Peng (10) Patent No.: US 9,786,314 B1
(45) Date of Patent: Oct. 10, 2017

(54) WAVEGUIDE SYSTEM WITH INTER-CORE COUPLER

(71) Applicant: Seagate Technology LLC, Cupertino, CA (US)

(72) Inventor: Chubing Peng, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/185,420

(22) Filed: Jun. 17, 2016

(51) Int. Cl.
| | | |
|---|---|---|
| G11B 11/00 | (2006.01) | |
| G11B 13/08 | (2006.01) | |
| G02B 6/293 | (2006.01) | |
| G02B 6/14 | (2006.01) | |
| G02B 6/10 | (2006.01) | |
| G11B 13/04 | (2006.01) | |
| G11B 5/00 | (2006.01) | |

(52) U.S. Cl.
CPC ............ *G11B 13/08* (2013.01); *G02B 6/105* (2013.01); *G02B 6/14* (2013.01); *G02B 6/29331* (2013.01); *G11B 13/045* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,208,800 A | * | 5/1993 | Isobe .................... | G02B 6/126 369/112.27 |
| 5,481,515 A | * | 1/1996 | Kando .................... | G11B 7/131 369/112.09 |
| 5,835,458 A | * | 11/1998 | Bischel .................. | G11B 7/122 369/112.27 |
| 6,631,227 B2 | * | 10/2003 | Kasama ................ | B82Y 10/00 369/112.01 |
| 7,792,402 B2 | * | 9/2010 | Peng ...................... | G02B 6/124 369/112.01 |
| 8,170,389 B1 | | 5/2012 | Komura et al. | |
| 8,614,932 B1 | * | 12/2013 | Sasaki ................... | G11B 5/314 369/13.17 |
| 9,001,628 B1 | | 4/2015 | Shi et al. | |
| 9,047,912 B1 | * | 6/2015 | Peng ....................... | G02B 6/00 |
| 9,218,836 B2 | | 12/2015 | Itagi et al. | |
| 2005/0122850 A1 | * | 6/2005 | Challener ............ | G11B 5/6088 369/13.24 |
| 2008/0204916 A1 | | 8/2008 | Matsumoto et al. | |
| 2009/0310459 A1 | * | 12/2009 | Gage ...................... | G11B 5/314 369/100 |
| 2011/0170381 A1 | * | 7/2011 | Matsumoto .......... | G11B 5/1278 369/13.33 |

(Continued)

*Primary Examiner* — Peter Vincent Agustin
(74) *Attorney, Agent, or Firm* — Hollingsworth Davis, LLC (57) ABSTRACT

A first waveguide core is configured to receive light via an input surface. The first waveguide core extends away from the input surface in a light propagation direction and terminates at a coupling region. A second waveguide core has a first end at the coupling region and a second end at a media-facing surface that is opposed to the input surface. The first end is separated from the termination of the first waveguide core by a gap in the coupling region. The coupling region includes an overlap between the first and second waveguide cores and is configured to promote evanescent coupling between the first and second waveguide cores.

19 Claims, 10 Drawing Sheets

(56) References Cited

U.S. PATENT DOCUMENTS

| | | | |
|---|---|---|---|
| 2011/0181979 A1* | 7/2011 | Jin | G11B 5/314 |
| | | | 360/59 |
| 2011/0216635 A1* | 9/2011 | Matsumoto | G11B 5/105 |
| | | | 369/13.33 |
| 2011/0292772 A1* | 12/2011 | Chou | G02B 6/107 |
| | | | 369/13.33 |
| 2014/0036646 A1* | 2/2014 | Peng | G11B 13/08 |
| | | | 369/13.33 |
| 2014/0133283 A1* | 5/2014 | Maletzky | G11B 5/314 |
| | | | 369/13.33 |
| 2014/0211598 A1* | 7/2014 | Wang | G02B 6/122 |
| | | | 369/13.24 |
| 2015/0131415 A1* | 5/2015 | Peng | G11B 5/1278 |
| | | | 369/13.32 |

* cited by examiner

WAVEGUIDE SYSTEM WITH INTER-CORE COUPLER

SUMMARY

The present disclosure is directed to a waveguide system with an inter-core coupler. In one embodiment, a first waveguide core is configured to receive light via an input surface. The first waveguide core extends away from the input surface in a light propagation direction and terminates at a coupling region. A second waveguide core has a first end at the coupling region and a second end at a media-facing surface that is opposed to the input surface. The first end is separated from the termination of the first waveguide core by a gap in the coupling region. The coupling region includes an overlap between the first and second waveguide cores and is configured to promote evanescent coupling between the first and second waveguide cores.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into the optical spot in a recording layer. The hotspot raises the media temperature locally, reducing the writing magnetic field required for high-density recording. A waveguide delivers light to the near-field transducer and excites the near-field transducer. Light from a light source, such as an edge-emitting laser diode, is coupled into the waveguide through waveguide input coupler or a spot size converter. In current configurations, the laser diode is mounted on a magnetic slider in such a way that a transverse electric (TE) polarized light source excites a TE waveguide mode in the slider waveguide while a transverse magnetic (TM) polarized light source excites a TM waveguide mode. The near-field transducer is designed to be coupled to light in one of these light delivery modes, and in response achieve surface plasmon resonance.

This disclosure describes light delivery using two core layers, separated by a dielectric layer of low index of refraction. Light is transferred between the core layers through vertical, evanescent field coupling; this is referred to herein as "inter-core coupling." There are many applications for an inter-core coupling waveguide system. For example, one way to couple light between a laser diode and a waveguide on slider uses a coupling layer and with core tapering from a narrow to wide width. The coupling layer is intended to match the beam size of the light source along the fast-axis direction for efficient coupling. The coupling layer can be a dielectric layer, for instance, $SiO_xN_y$ (silicon oxynitride), called CL1 layer, of slightly higher index of refraction than surrounding layers. Light is first coupled into the CL1 layer and then transferred to the waveguide core. Once the transfer is completed, this layer functions as a waveguide cladding for the core.

For near-field transducer efficiency, a layer of low index of refraction, such as $SiO_2$ (silica), called CL7 may be used for waveguide cladding around the near-field transducer. A smooth CL1-to-CL7 transition has been found to prevent loss. Wafer data shows that this approach does improve light transmission by 10% but still presents ~10% loss. The embodiments described below use two core layers that transfer light through evanescent field coupling such that the optical energy is transferred from the core with CL1 cladding to another core which is away from the CL1 layer. The CL1 patterning used to transition from CL1 to CL7 (if needed) will result in negligible loss.

Another application in which inter-core coupling may be used relates to light delivery using a first-higher order transverse electric mode, $TE_{10}$, for near-field transducer excitation. The light path in such a case may include a mode converter (e.g., branched waveguide) that converts the light from a fundamental mode, e.g., $TE_{00}$, provided from the light source to a higher-order mode, e.g., $TE_{10}$. Due to factors such as manufacturing tolerances, such mode converters do not convert all of the light to the higher-order mode, such that a portion of the unconverted light can propagate to the output together with the converted light.

Design tolerance and transmission efficiency depend on the contrast in the index of refraction between waveguide core and cladding. The fabrication process to satisfy the design specification is also related to the core material property, such as etch rate. For instance, wafer learning on light path with a $Ta_2O_5$ (tantalum oxide) core and with a $Nb_2O_5$ (niobium oxide) showed that wafers with $Nb_2O_5$ core drop more than 10 mA in the laser current required for writing a magnetic transition and also have much narrower distribution in laser current among devices.

Inter-core coupling provides the freedom to choose a core material to best form the branched waveguide light path while use another core optimized (for instance, by selection of material, waveguide dimension, etc.) to excite a near-field transducer. The two core layers are coupled by evanescent field coupling and the optical energy is transferred from one to another core. If the two cores have significantly different index of refraction, inter-core coupling can even cleanup some amounts of un-desired fundamental TE mode, $TE_{00}$ that may have not been converted by the mode converter.

In some applications, the near-field transducer with a TE mode light delivery is placed in the cladding next to the core. A thin core is often used to have greater evanescent field to excite the NFT. A thin core may yield an effective mode index below the index of refraction of the compact alumina ($Al_2O_3$) used for heads overcoat and basecoat, resulting in mode leaking into the overcoat and basecoat. Inter-core coupling embodiments described herein allow the coupling from a thick input core to a thin output core for NFT excitation. A thin output core can have a short length to mitigate this leaky loss. Similarly, a waveguide bend may be used in the light delivery path in some applications. Bending loss can be minimized if the mode has a high effective mode index. As with the thin core, an inter-core coupling scheme can be used to achieve a thick input core to mitigate bending loss for bent waveguides.

Other applications in which an inter-core coupling scheme may be benefit relates to a spot size converter with a wedge-shaped taper waveguide. Such technologies use a thick core, ~400 nm thick, and a TM waveguide mode light delivery. A wedge shape spot size converter can improve the efficiency of light being coupled into a thick core. But the process to form the wedges is challenging. If the idea to use coupling layer is applied to couple light into a waveguide of thick core, CL1 will have quite large index of refraction. The subsequent CL1-to-CL7 transition will cause large loss. The inter-core coupler allows the use of a thin core and a coupling layer (CL1) to couple with a light source and a thick core for near-field transducer excitation. Light is transferred from the thin core to a thick core through evanescent field coupling. In this circumstance, CL1 patterning may not be needed, since the mode index is high and there is negligible field residing in the CL1 layer.

Finally, it is noted that some light sources for HAMR are coupled with a slider through laser-chip submount bonding onto the top slider surface that is opposite to the media-facing surface. To reduce cost in the manufacture, an alternative way is to use hybrid integration between an active light source and a passive waveguide on a slider by wafer bonding or by "pick-and-place" methods. An inter-core coupling can be used in such a case to transfer optical power from the active light source to the slider passive waveguide by evanescent field coupling.

Figure 1:
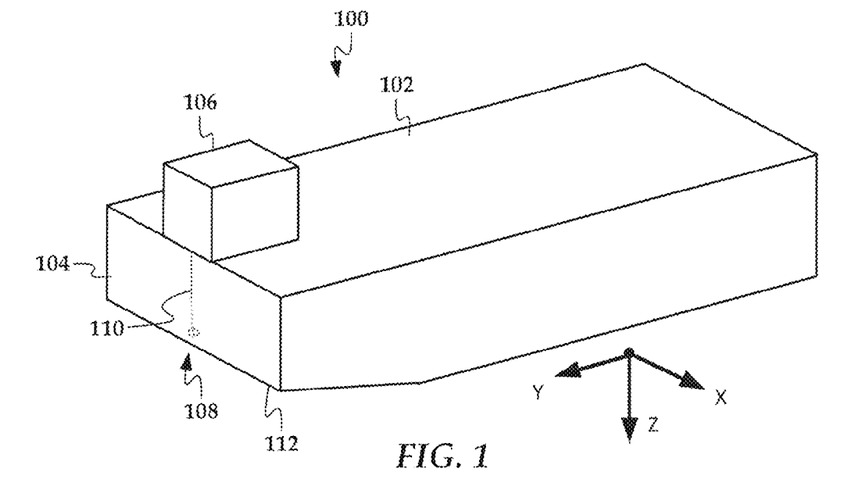
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium.

Figure 2:
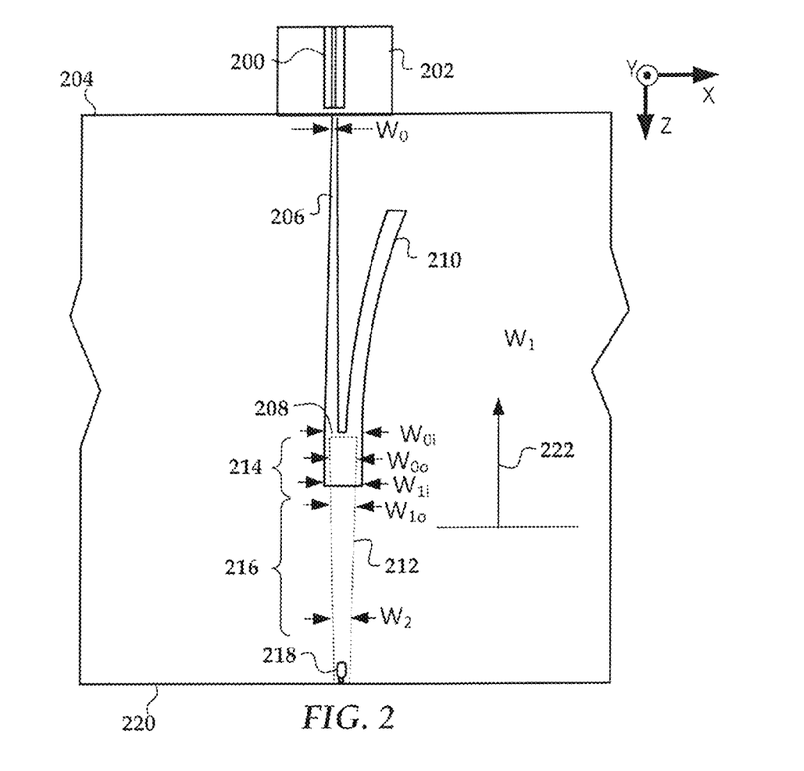
FIGS. 2 and 3 are cross-sectional views of a slider with a waveguide system according to an example embodiment.

In FIG. 2, a view of a slider trailing edge shows a light delivery configuration according to an example embodiment. Other details of this light delivery configuration are shown in the cross-sectional view and perspective view of FIGS. 3 and 4, respectively. As seen in FIG. 2, a transverse electric (TE) polarized laser source 200, for instance, an edge-emitting laser diode mounted on a submount 202, launches light into an input waveguide 206 on a slider 204. The light source 200 excites a fundamental $TE_{00}$ mode propagating along a first core 208, which extends from the junction of the input waveguide 206 with a branch waveguide 210. The fundamental mode is converted to a first higher-order mode, $TE_{10}$, via the branch waveguide 210.

The $TE_{10}$) light is then transferred from the first core 208 to a second core 212 by evanescent field coupling in an inter-core coupling region 214. The evanescent field coupling uses the decaying tail of optical modes to transfer power from the first core 208 to the second core 212. This power transfer could be complete if the two waveguides are phase-matched and have similar mode profiles.

Tapering the core width in one or both waveguides in the coupling zone 214 relaxes the specification in the waveguide geometry and also flattens the intrinsic wavelength dependence of the coupling. The near-field transducer 218 is configured as a rounded, enlarged portion (e.g., a circle or stadium shape) with a peg extending towards the media-facing surface 220. This configuration of near-field transducer 218 is designed to resonate in response to the first higher-order mode.

The material of the first core 208 can be chosen such that it eases the fabrication process, for instance, large margin in waveguide geometry and low loss in forming the waveguide structure. The second core 212 might use another material and/or different geometry, optimized for the excitation of the near-field transducer 218. If the two cores 208, 212 have significant difference in material and/or in waveguide geometry, the inter-core coupler can remove some of residual, unconverted $TE_{00}$ mode propagating in the first core 208 due to incomplete $TE_{00}$-to-$TE_{10}$) mode conversion and prevent it from being coupled into the second core 212.

Figure 3:
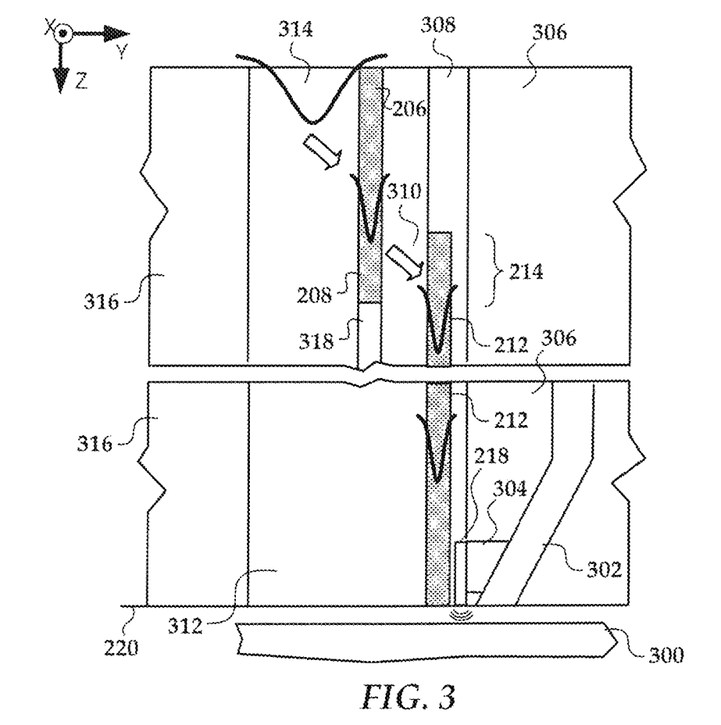

As seen in FIG. 3, light propagates in the second core 212 and eventually excites the plasmonic near-field transducer 218. Excitation of the near-field transducer 218 concentrates optical energy into a tiny spot well below far-field diffraction limit. This energy is transferred into a magnetic recording medium 300 to heat the medium during writing with a switching magnetic field from a magnetic pole 302.

Also seen in FIG. 3 is a heat sink 304 that thermally couples the near-field transducer 218 to the magnetic pole 302. A top cladding layer 306 covers the heat sink 304. A side cladding layer 308 covers sides of the second core 212 and lies between the second core 212 and the top cladding layer. A side cladding layer 318 also covers the sides of the first core 208. A gap 310 between the waveguide cores 208, 212 is filled with a separation layer, e.g., CL7 cladding material. In such a case, the CL7 cladding may also extend to region 312 on a side of the second core 212 that faces away from the near-field transducers 218. An input coupling layer 314 is on one side of the first core 208 and is formed of a CL1 material. The coupling layer 314 and CL7 layer 312 are adjacent a bottom cladding layer 316. The transition from CL1 to CL7 materials occur in region 214 shown in FIG. 2. The arrow 222 in FIG. 2 indicates an approximate boundary of the CL1 region.

Efficient coupling from a light source to waveguide allows a compact light source to be used and also reduces stray light that can induce writer and reader protrusion. The coupling efficiency is determined by the mode overlap between the light source and waveguide. For a typical edge-emitting laser diode, the output beam size in $1/e^2$ intensity full width is about 1.2 µm along its fast axis direction and 5.2 µm along its slow axis direction. For a waveguide used in heat-assisted magnetic recording, the fundamental mode size is about 0.20 µm normal to the waveguide plane and smaller than 0.50 µm parallel to the waveguide plane. There is significant mode mismatch between the light source and waveguide.

The waveguide assembly can incorporate an assistant layer or coupling layer underneath or above the waveguide core (e.g., coupling layer 314) to couple light from the light source into the coupling layer. Core tapering from a narrow to wide width can also be used to transfer light from the coupling layer to the core, as shown by the taper of input waveguide 206 in FIG. 2. The coupling layer 314 is optimized to match the mode size of the light source normal to waveguide plane. For example, this optimization may be obtained by choosing a desired thickness normal to waveguide plane along the y-direction and index of refraction of the material. The core start width (see $W_0$ in FIG. 2) adjacent to the light source 200 is chosen to match the mode size of the light source parallel to waveguide plane along the x-direction.

The core width of the input waveguide 206 increases with distance away from the light source 200 where it joins up with core section 208 near the coupling region 214. As shown in FIG. 3, light exiting from the light source 200 is first coupled into the coupling layer 314 and is then transferred into the waveguide core 206, 208 slowly. The waveguide core 206 is made of dielectric materials of high index of refraction, for instance, $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon).

The coupling layer 314 is formed of a dielectric material having an index of refraction slightly higher than that of the bottom cladding 316 but much lower than that of the core, for instance, $SiO_xN_y$ (silicon oxynitride), AlN (aluminum nitride) and alloys $SiO_2$—$Ta_2O_5$, $SiO_2$—ZnS, $SiO_2$—$TiO_2$. The top and bottom cladding layers 306, 316 are each formed of a dielectric material having a refractive index lower than the core and the coupling layer, be made of a material, for instance, $Al_2O_3$ (aluminum oxide), SiO and $SiO_2$ (silica).

For instance, if $Al_2O_3$ having an index of refraction n=1.65 is used for both the top and bottom cladding layers 306, 316, a 120 nm thick $Nb_2O_5$ layer may be used for core material, n=2.29. The optimized coupling layer 314 uses silicon oxynitride with n=1.70 and is 600 nm thick. For near-field transducer excitation efficiency, it is preferred to use a material of low index refraction as a bottom cladding 316, for instance, $SiO_2$ (silica), n=1.46, porous silica and alumina (n≈1-1.26), such that the waveguide mode field is pushed into the near-field transducer 218. For this purpose, one approach is to truncate the coupling layer 314 and fill with another material of low index of refraction after the light is coupled into the waveguide. As noted above, the material before truncation is called CL1 and CL7 after truncation.

Because there is some difference in the index of refraction between CL1 (n=1.7) and CL7 (n=1.46 if silica is used) and further because CL1 is next to the core, there will be ~15% efficiency loss from CL1 to CL7 if the two materials are butted. Wafer data shows that a gradual CL1-to-CL7 transmission is improved by 10%, but still presents 10% loss. In this example, inter-core coupling in coupling region 214 results in light being transferred from the first core 208 to the second core 212. If CL7 material is used as a spacer between the first core 208 to the second core 212 and the second core 212 is far away (e.g., 350-500 nm) from CL1, the CL1-to-CL7 transition, even though it is still used for light delivery with a $TE_{10}$) mode, will result in negligible loss.

Figure 4:
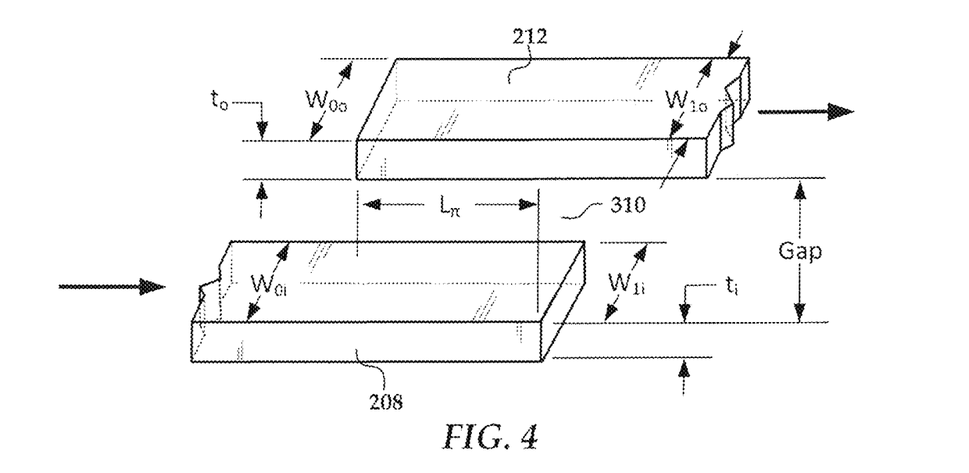
FIG. 4 is a perspective view of an inter-core coupler according to an example embodiment.
Figure 5:
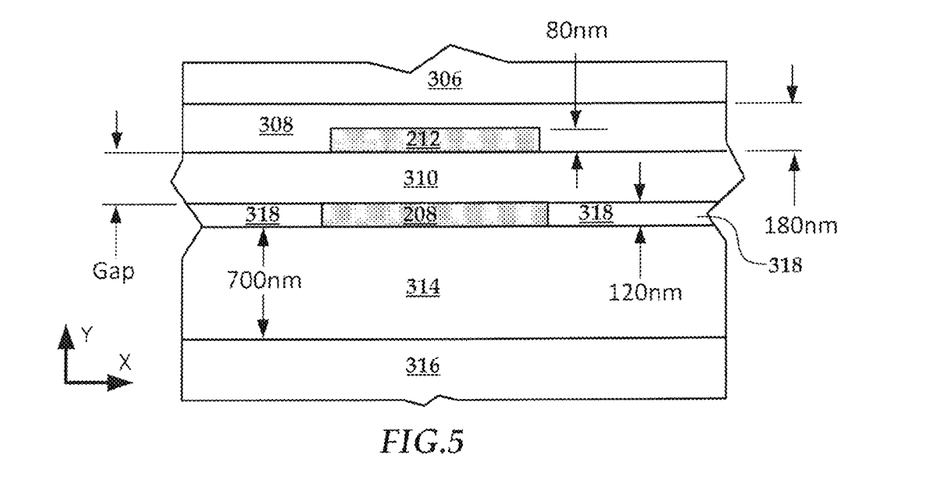
FIG. 5 is a cross-sectional view showing details of an inter-core coupler according to an example embodiment.

To demonstrate the feasibility of this approach, a configuration as shown in the cross sectional view of FIG. 5 was modeled. The dimensions shown in the cross-section view of FIG. 2 and perspective view of FIG. 4 are referenced in the modeling results modeling. For this model, the first core 208 uses a 120 nm thick $Nb_2O_5$ layer (n=2.29) and the second core 212 uses an 80 nm thick SiC layer (n=2.60). The CL1 coupling layer 314 (n=1.70) is next to the first core 208 and 700 nm thick. The separation layer 310 between the two cores is $SiO_2$ (n=1.46). The side cladding 308, 318 for both waveguides is $Al_2O_3$ (n=1.63). Side cladding layer 308 is 180 nm thick, which is thicker than the second core 212, while side cladding layer 318 has the same 120 nm thickness of the first core 208. For this model, light wavelength λ=0.83 µm.

The first, $Nb_2O_5$ core 208 is coupled to the light source, and the second, SiC, core 212 delivers light to a near-field transducer. Better mode confinement in a core of higher index of refraction yields greater NFT excitation efficiency, but will also result in tighter specification in the waveguide geometry to achieve full $TE_{00}$-to-$TE_{10}$) mode conversion. Inter-core coupler provides the freedom to choose appropriate core material and/or geometry to ease the fabrication process and in the meantime, to maximize the NFT performance.

Figure 6:
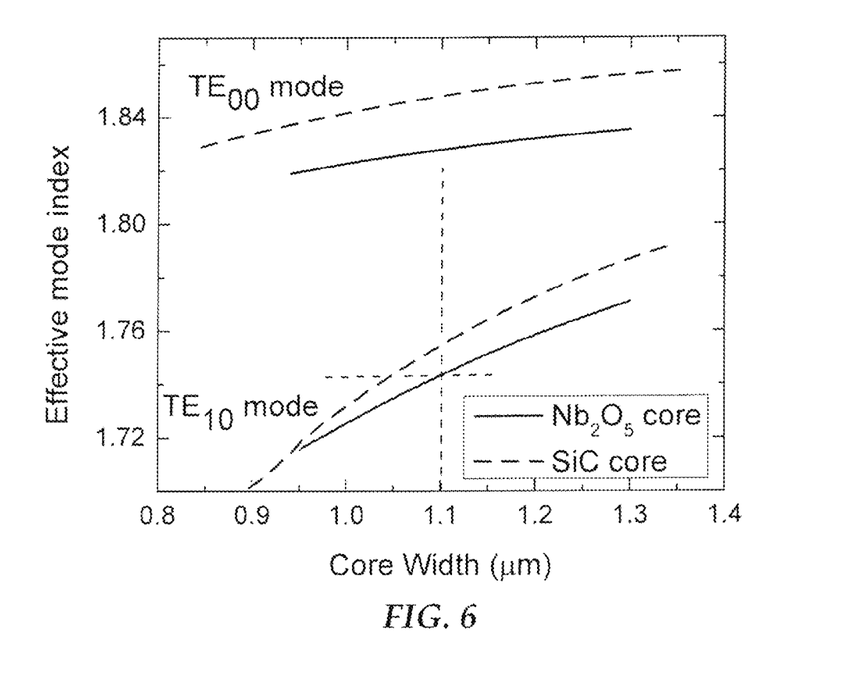
FIGS. 6-12 are plots showing results of modeling a waveguide system as shown in FIGS. 2-5.
Figure 7:
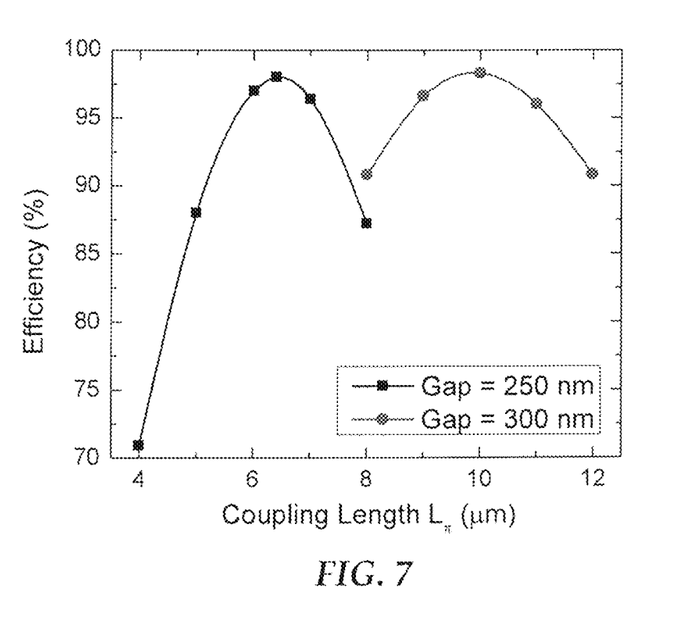
Figure 8:
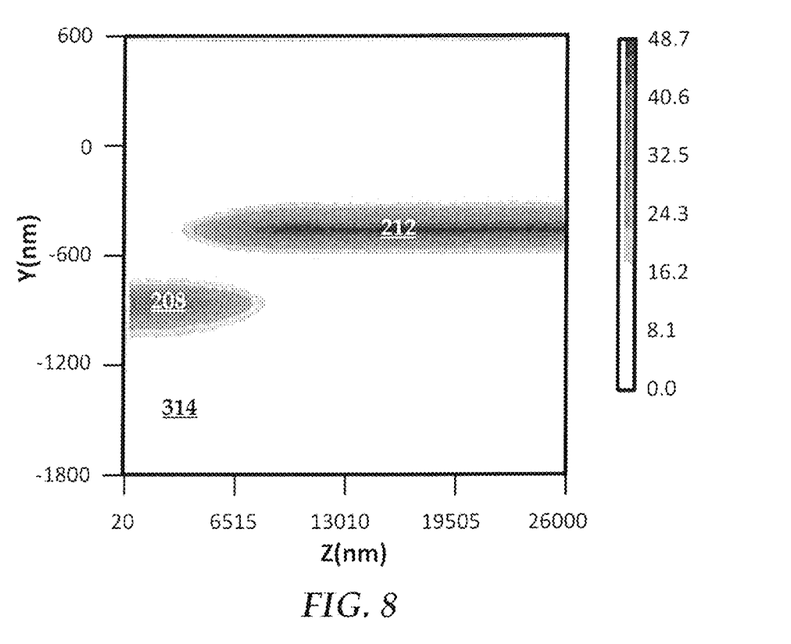
Figure 9:
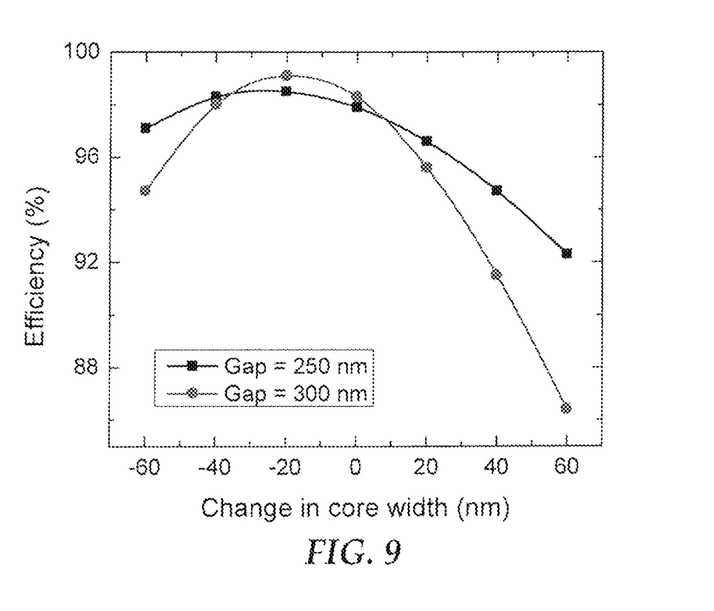
Figure 10:
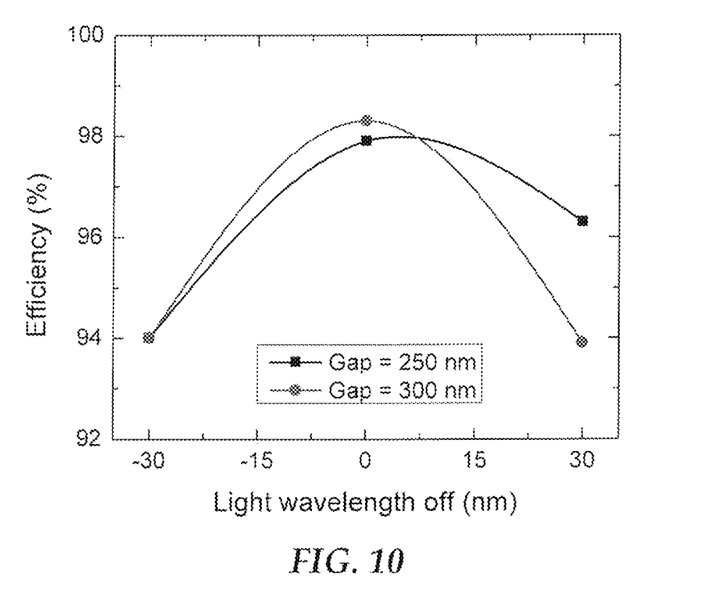
Figure 11:
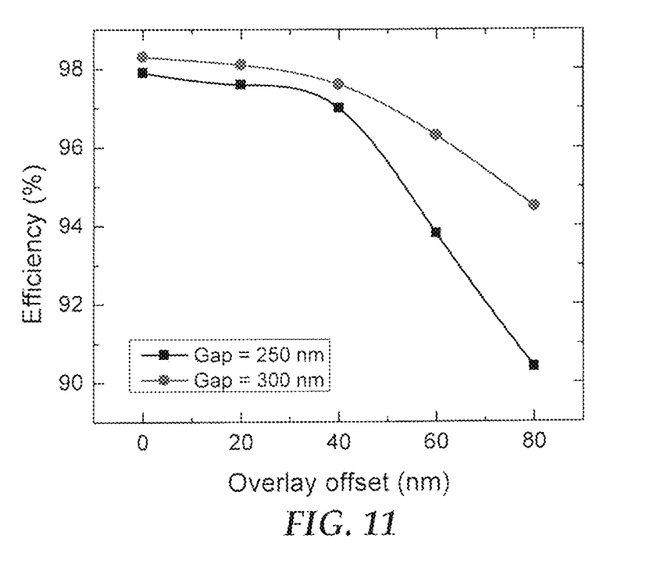
Figure 12:
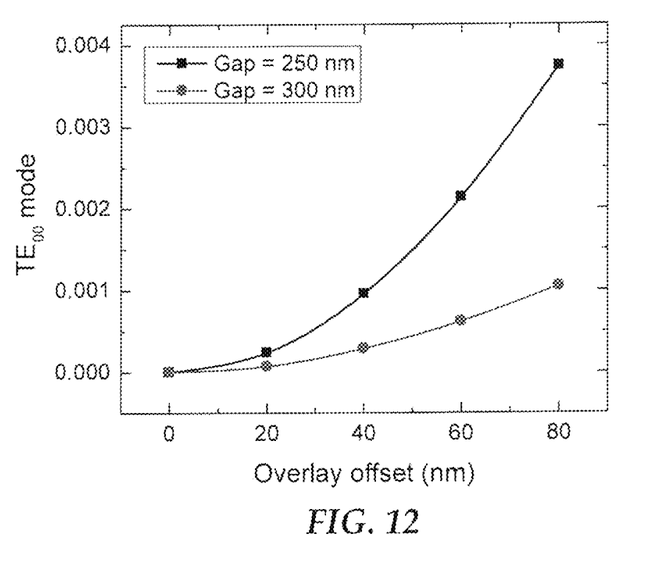

The graphs in FIGS. 6-8 show the results of the modeling. The graph in FIG. 6 shows effective mode index supported by each isolated waveguide versus core width (x-dimension). Phase matching condition is satisfied at SiC core width 1.05 µm if the $Nb_2O_5$ core is 1.1 µm wide. The graph in FIG. 7 shows coupling efficiency versus coupling length (overlap between the cores, Lπ) in the coupling region 214 from $Nb_2O_5$ to SiC core at the separation Gap=250 nm and 300 nm. The SiC core tapers from 0.9 to 1.2 µm. In this case, the largest optimum coupling length of about 10 µm is less than 6% of the distance between the input and output (e.g., top and bottom) surfaces of the slider, and generally may be less than 15% of the top-to-bottom distance in most configurations. The contour plot in FIG. 8 shows profile of the electric field amplitude on a yz-plane for the case with Gap=300 nm and at coupling length $L_\pi$=10 µm.

As the core width >0.9 µm, both individual waveguides support two TE modes, $TE_{00}$ and $TE_{10}$. In the inter-core coupling region, the width of $Nb_2O_5$ core is chosen to be 1.10 µm so that the odd $TE_{10}$ supermode of the combined $Nb_2O_5$ and SiC waveguide has an effective mode index greater than the index of CL1 at Gap >200 nm. At this $Nb_2O_5$ core width, the phase matching condition is satisfied for the $TE_{10}$-to-$TE_{10}$ coupling at SiC core width ≈1.05 µm (see FIG. 6).

It is evident that at this phase matching condition for the $TE_{10}$ mode, there is a large difference in the $TE_{00}$ mode index between the two individual waveguides. Therefore, the power transfer of $TE_{00}$ mode from $Nb_2O_5$ to SiC core will be only partial, as desired. To flatten the inter-core coupling for broadband operation and also for relaxing the tolerance in the waveguide geometry, the SiC core is tapered, from $W_{0o}=0.9$ μm to $W_{1o}=1.20$ μm.

A rule of thumb for choosing an appropriate amount of tapering is to maximize the tapering without loss of efficiency at a desired separation, Gap. Note that the separation Gap is formed by deposition, and can be controlled to 1% variation. But the core is formed by etch; there are variations in the core width. So tapering in the core width is used to have phase matching condition satisfied. The negative side of tapering is that the power transfer of the undesired $TE_{00}$ mode will be increased.

One loss incurred in the inter-core coupling is caused by the blunt end of the input core and the blunt start of the output core, called termination loss. The termination loss may be minimized by tapering the end width of the input core and the start width of the output core as well as by choosing large separation, Gap. Another loss incurred is the dissimilarity in the mode spatial profile between two waveguides.

As seen in FIG. 7, 98% efficiency can be obtained at a coupling length as short as 10 μm, even with blunt end in the input waveguide and blunt start in the output waveguide. It is evident that from FIG. 8, there is negligible field residing in the CL1 layer 314 as the light is transferred to the SiC core 212. If CL1 is truncated and replaced with CL7, there will be negligible loss, proving the advantage of inter-core coupling.

The graphs in FIGS. 9-12 show the tolerance analysis in the variation of core width, light wavelength, and overlay offset between two core layers. In practice, the overlay offset between two layers is about 20 nm. ±40K changes in the junction temperature of a Fabry-Perot edge emitting laser diode can have ±10 nm changes in the emission wavelength. Better than 95% inter-core coupling efficiency could be obtained. Note that overlay offset between the two core layers may also generate $TE_{00}$ mode in the output waveguide. But the amount of $TE_{00}$) mode generated is <0.1% if the overlay offset <40 nm. This will not cause any penalty in the recording performance.

Figure 13:
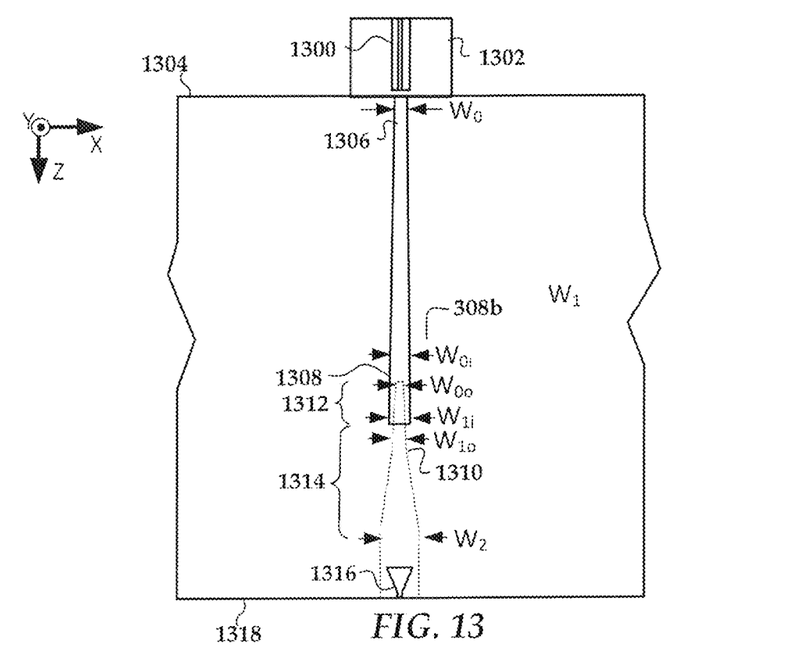
FIGS. 13-15 are cross-sectional views of a slider with a waveguide system according to another example embodiment.
Figure 14:
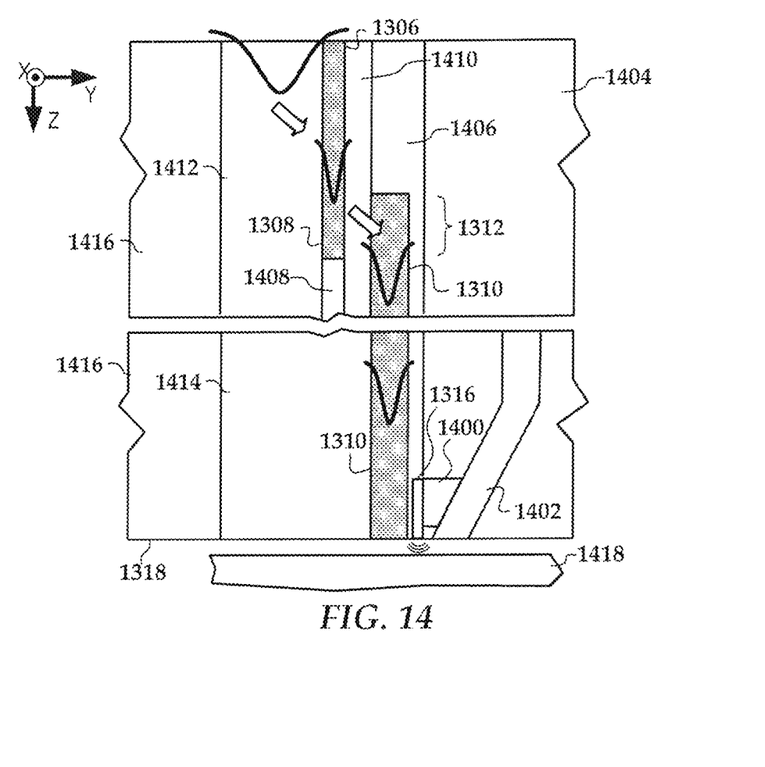
Figure 15:
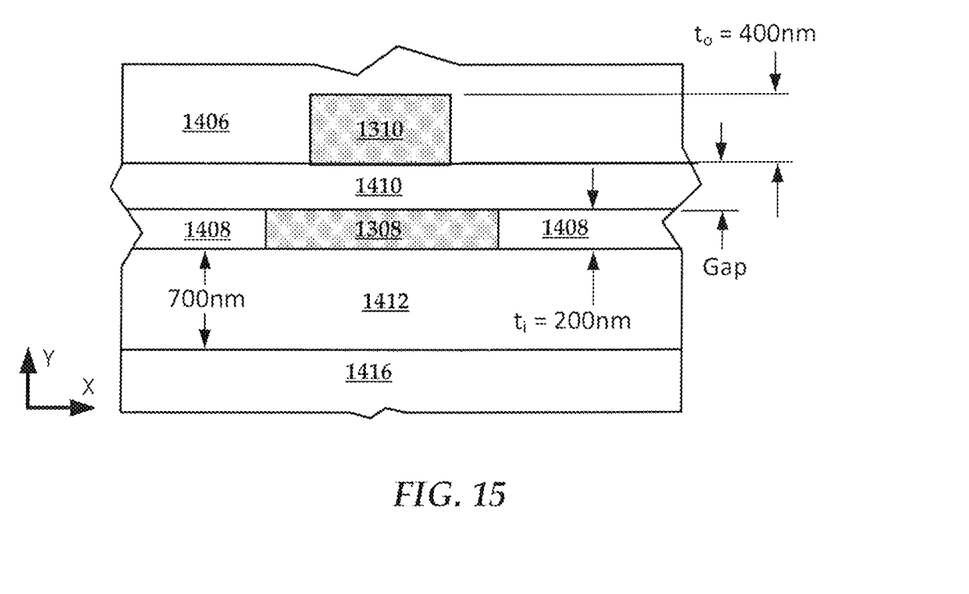

Another way to achieve inter-core coupling is to couple light from a thin core (first core) to a thick core (second core). Light delivery with a thick core occurs for NFT design excited by a transverse magnetic (TM) mode and the light source is TM polarized. One such NFT geometry has triangular shape with a tip toward the media-facing surface and the NFT is placed at the top cladding layer next to the waveguide core. The cross-sectional views of FIGS. 13-15 show an example embodiment using this type of coupling. As seen in FIG. 13, a transverse magnetic (TM) polarized laser source 1300, for instance, an edge-emitting laser diode, mounted on a submount 1302, launches fundamental mode ($TM_{00}$) light into a slider 1304 by way of an input waveguide 1306.

The input waveguide 1306 transitions to a first core 1308 that overlaps a second core 1310 in inter-coupling region 1312. The $TM_{00}$ light is coupled from the first core 1308 to the second core 1310 by evanescent field coupling in the inter-core coupling region 1312. The second core 1310 is tapered in region 1314 as it approaches near-field transducer 1316 at media-facing surface 1318. As with the previous example, a CL1-to-CL7 cladding transition may optionally occur in region 1314.

As seen in FIG. 14, a heat sink 1400 may couple the near-field transducer 1316 to a write pole 1402. As with the previous embodiments, the waveguide system includes a top cladding layer 1404, side cladding layers 1406, 1408, separation layer 1410, coupling layer (CL1) 1412, CL7 layer 1414, and bottom cladding layer 1416. A recording medium 1418 is shown near the media-facing surface 1318.

As shown in FIG. 15, the second core 1310 is formed of $Ta_2O_5$, in which case the thickness (along the Y-direction) of the second core 1310 is ~400 nm and the width (along X direction) is ~600 nm. Another option is to taper the core to a small dimension, for instance, 60 nm along the x-direction by 15 nm along the y-direction. The core is then wrapped with a plasmonic metal, such as Au, Cu, Ag, Rh, Ir, and Pt, to form a dielectric aperture near the media-facing surface. The optimized core thickness is ~340 nm.

As described above, a coupling layer or a wedge taper waveguide can be used to couple light into a waveguide with a thick core. If a coupling layer is used, a coupling efficiency of >84% could be obtained as the CL1 has an index of refraction n≈1.82. Due to the large difference in the index of refraction between CL1 and CL7 material, it will be even more difficult to achieve a lossless CL1-to-CL7 transition than the above case with a thin core. As noted above regarding the wedge, it is challenging to form a wedge taper. Instead, the present examples use an inter-core coupler to couple light into the thick-core waveguide.

Figure 16:
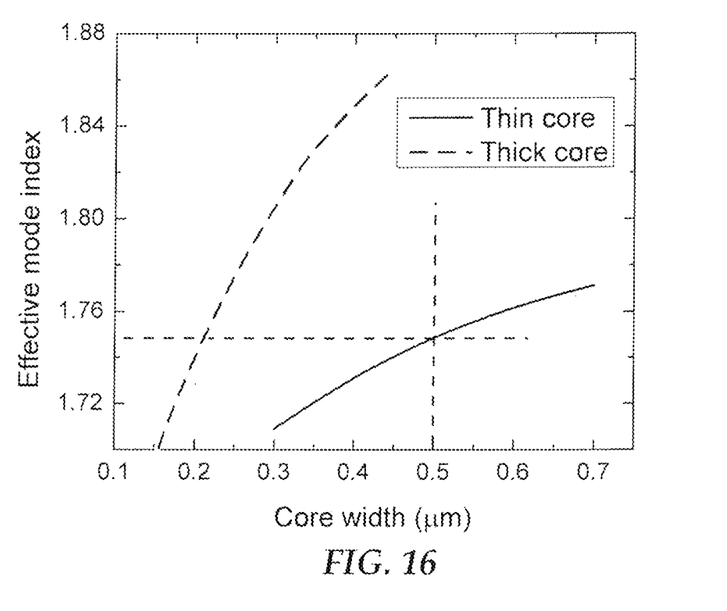
FIGS. 16-19 are plots showing results of modeling a waveguide system as shown in FIGS. 13-15.

Both waveguides cores 1308, 1310 are formed of $Ta_2O_5$ core, n=2.1. The input core is thin, $t_i=200$ nm, and the output core is thick, desired for NFT excitation, $t_o=400$ nm. The side cladding 1406, 1408, separation layer 1410, and top cladding 1404 all use $Al_2O_3$, n=1.63. A fundamental transverse magnetic mode, $TM_{00}$, is excited and propagates in the thin core 1308. Optimal conditions for the coupling between a light source and the thin core 1308 are: the CL1 has an index of refraction n=1.70 and the thin core tapers from $W_0=100$ nm to a width greater than 0.3 μm that supports a TM mode in the thin core (see FIG. 13). The laser light wavelength λ=0.808 μm. In FIG. 16, a graph shows the effective indices of the fundamental TM mode, $TM_{00}$, versus core width for both individual waveguides.

As seen in FIG. 16, the mode index of the thick waveguide has much stronger dependence on the core width than that of the thin core. From a fabrication point of view, it is better to choose the core widths in the inter-core coupling region such that the effective mode index has low sensitivity to core width. This involves forming a very wide, thin core, such that the light path may be too long to fit into current magnetic slider. For this modeling, the thin core 1308, which is coupled to the light source, is set to be $W_{0i}=W_{i1}=0.5$ μm, and is not tapered. As for the thick core 1310, which delivers light into a NFT, the start width $W_{0o}$ is chosen as narrow as possible, down to 120 nm, which can be fabricated with current photolithography equipped with a 193 nm UV (ultra-violet) light source. The end width, $W_{1o}$, is as wide as possible, and the separation, Gap, as large as possible. These values are compromises to reach nearly complete inter-core power transfer at a short coupling length and with a margin in geometry that can be fabricated.

Figure 18:
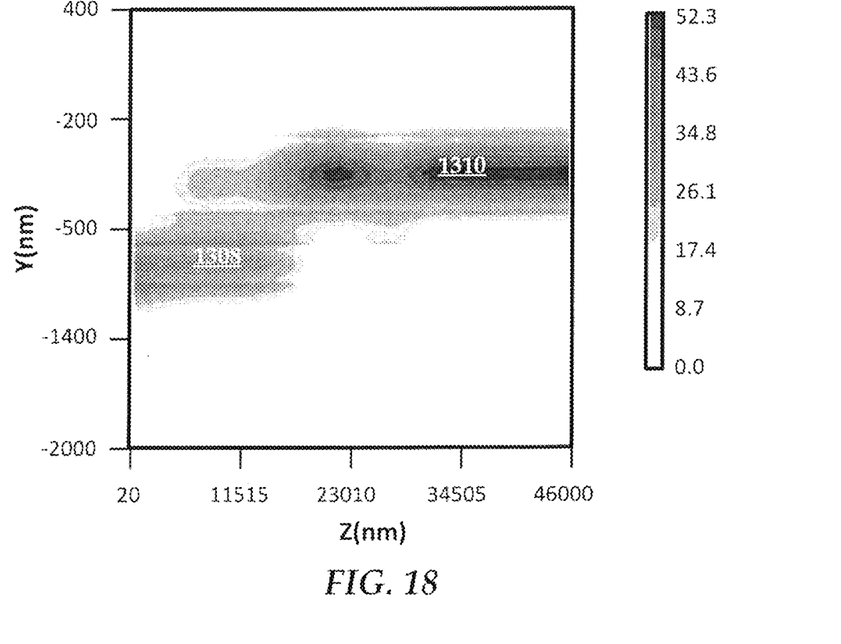
Figure 19:
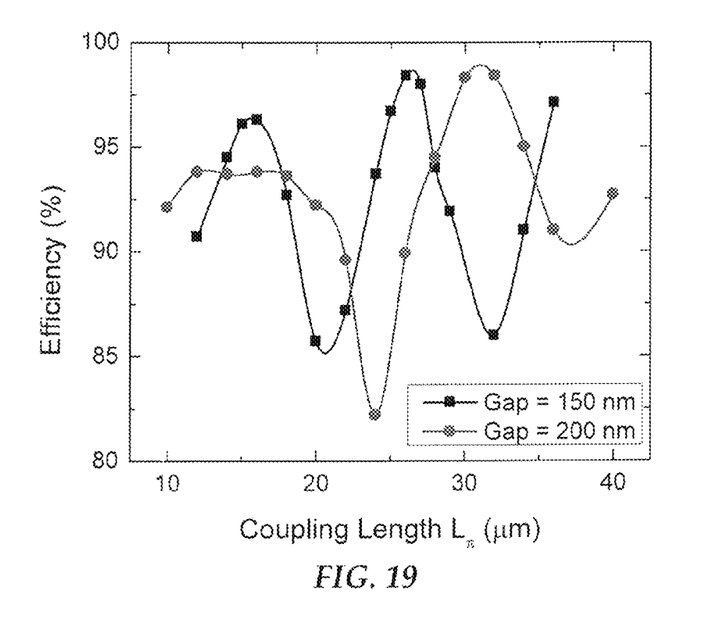

In fabrication, the core thickness and separation Gap can be precisely controlled. The variation mainly comes from the width of the thick core 1310. To evaluate the feasibility of inter-core coupling scheme, the inter-core coupling efficiency is examined by assuming ±20 nm variations in both start ($W_{0o}$) and end ($W_{1o}$) widths of the thick core. The operation bandwidth is also examined by assuming ±30 nm changes in the light wavelength, which corresponds to a change in ambient temperature from +120 to −120 K. The graphs in FIGS. 17-19 show the results of modeling inter-core $TM_{00}$ mode coupling from a 200-nm thick $Ta_2O_5$ core to a 400-nm thick $Ta_2O_5$ core.

Figure 17:
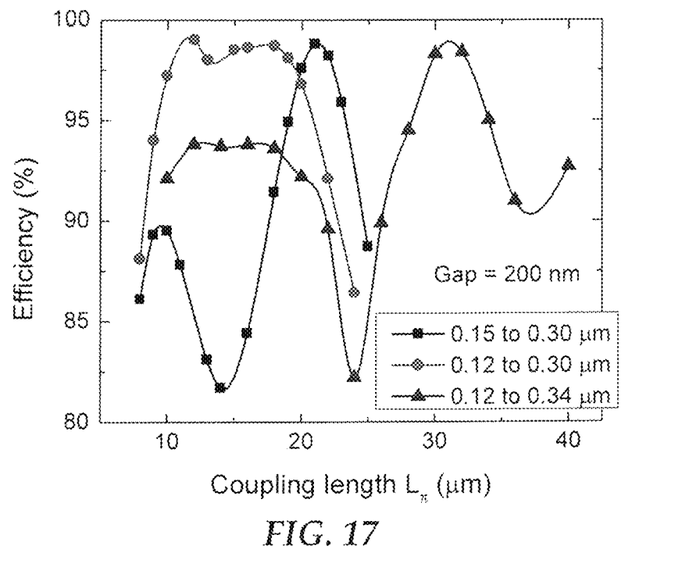

The graph of FIG. 17 shows coupling efficiency versus coupling length at a separation Gap=200 nm and at three tapering in the thick $Ta_2O_5$ core. The contour plot of FIG. 18 shows profile of the field amplitude at terminating ends of the first core 1308 and the second core 1310 on a yz-plane for the case with Gap=300 nm, thick core width tapering from 0.12 to 0.34 µm, and coupling length $L_\pi$=31 µm. The graph of FIG. 19 shows coupling efficiency versus coupling length at a separation for Gap=150 nm and 200 nm. The width tapering in the thick $Ta_2O_5$ core is from 0.12 to 0.34 µm.

These results indicate a 99% inter-core coupling efficiency could be obtained. At Gap=200 nm, for shallow tapering from 0.15 to 0.30 µm, the first peak in the coupling efficiency occurs at coupling length L, =9.6 µm and the second peak at $L_\pi$=21.4 µm. At the second peak, the tapering is slower so the efficiency is greater. If the taper width varies by 20 nm, the efficiency drops to 92%. So more tapering is needed to relax the tolerance in controlling the width. More tapering in core width emerges the first and second peak into a broad plateau. Variation analysis in both core width and wavelength shows that the efficiency is better than 97% for the tapering from 0.12 to 0.34 µm and at the third peak ($L_\pi$=31 µm). If the separation Gap is reduced to 150 nm, the coupling length is shortened by 5 µm, see FIG. 19, but the coupling is slightly more sensitive to the variation in core width and the efficiency is still better than 96%.

In summary, for light path with a TE mode delivery, inter-core coupling improves the light delivery efficiency by minimizing loss occurred from the CL1-CL7 transition and mode leaking loss. The two waveguides may have the same or different materials, and/or different geometries, such as waveguide cross section and core thickness. It provides the freedom to optimize the two waveguides for their respective purpose. It also provides a practical solution to use a thick waveguide for a TM mode delivery. Moreover, it allows hybrid integration between an active device such as a laser diode and a passive waveguide on a HAMR slider by wafer bonding or "pick-and-place" methods.

Figure 20:
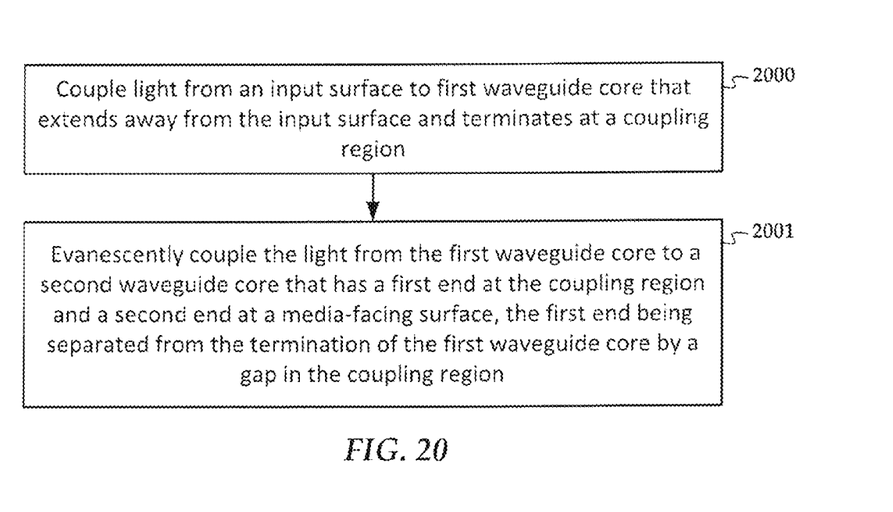
FIG. 20 is a flowchart of a method according to an example embodiment.

In FIG. 20, a flowchart shows a method according to an example embodiment. The method involves coupling 2000 light from an input surface to first waveguide core that extends away from the input surface in a light propagation direction and terminates at a coupling region. The light is evanescently coupled 2001 from the first waveguide core to a second waveguide core that has a first end at the coupling region and a second end at a media-facing surface that is opposed to the input surface. The first end is separated from the termination of the first waveguide core by a gap in the coupling region.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a first waveguide core configured to receive light via an input surface, the first waveguide core extending away from the input surface in a light propagation direction and terminating at a coupling region;
   a second waveguide core having a first end at the coupling region and a second end at a media-facing surface that is opposed to the input surface, the first end separated from the termination of the first waveguide core by a gap in the coupling region, the coupling region comprising an overlap between the first and second waveguide cores and configured to promote evanescent coupling between the first and second waveguide cores;
   a near-field transducer at the media-facing surface in a cladding layer that is adjacent the second waveguide core;
   a coupling layer adjacent sides of the first and second waveguide cores that face away from the near-field transducer, the light being coupled into the first waveguide via the coupling layer; and
   a bottom cladding layer adjacent the coupling layer opposite the first and second waveguide cores, wherein the coupling layer extends at least from the input surface to the coupling region and comprises a first refractive index between that of both waveguide cores and the bottom cladding layer.

2. The apparatus of claim 1, wherein the first and second waveguide cores are phase-matched and have similar mode profiles.

3. The apparatus of claim 1, wherein the first and second waveguide cores are formed of different materials.

4. The apparatus of claim 1, wherein the thickness of the second waveguide core in a downtrack direction is different from the first waveguide core.

5. The apparatus of claim 1, wherein the overlap between the first and second waveguide cores has a dimension in the light propagation direction that is less than 15% of a distance between the input surface and an output surface.

6. The apparatus of claim 1, further comprising a second cladding layer adjacent the second waveguide core opposite the near-field transducer, the second cladding layer having a second refractive index that is less than that of the coupling layer, a transition between the coupling layer and the second cladding layer occurring between the coupling region and the output surface.

7. The apparatus of claim 1, wherein the light is coupled into the first waveguide core in a fundamental mode, the apparatus further comprising a mode converter between the input surface and the coupling region, the mode converter converting at least a portion of the light to a higher-order mode.

8. The apparatus of claim 7, wherein the coupling region prevents a second portion of unconverted light in the fundamental mode from being coupled into the second waveguide core.

9. A method comprising:
   coupling light from an input surface to a first waveguide core that extends away from the input surface in a light propagation direction and terminates at a coupling region;
   converting at least a portion of the light from a fundamental mode to a higher-order mode;
   evanescent coupling the light from the first waveguide core to a second waveguide core that has a first end at the coupling region and a second end at a media-facing surface that is opposed to the input surface, the first end overlapping the first waveguide core in the coupling region and separated from the first waveguide core by a gap in the coupling region; and preventing a second portion of unconverted light in the fundamental mode from being coupled into the second waveguide core via the coupling region.

10. The method of claim 9, wherein the thickness of the second waveguide core is different in a downtrack direction than the first waveguide core.

11. The method of claim 9, wherein the first and second waveguide cores are phase-matched and have similar mode profiles.

12. The method of claim 9, wherein the light is coupled into the first waveguide core in a transverse magnetic mode.

13. The method of claim 9, wherein the light is coupled into the first waveguide core in a transverse electric mode.

14. An apparatus comprising:
a near-field transducer at a media-facing surface, the near-field transducer comprising a rounded, enlarged portion with a peg extending from the enlarged portion towards the media-facing surface;
a first waveguide core configured to receive light at a fundamental transverse electric mode via an input surface opposed to the media facing surface, the first waveguide core extending away from the input surface towards the media-facing surface and terminating at a coupling region; and
a second waveguide core formed of a different material than the first core and having a first end overlapping the first waveguide core at the coupling region and a second end at the media-facing surface proximate the near-field transducer, the first end separated from the termination of the first waveguide core by a gap in the coupling region, the coupling region promoting evanescent coupling between the first and second waveguide cores; and
a mode converter between the input surface and the coupling region, the mode converter converting at least a portion of the light to a higher-order transverse electric mode, the near-field transducer being configured to resonate in response to the higher-order mode.

15. An apparatus comprising:
a first waveguide core configured to receive light via an input surface, the light being coupled into the first waveguide core in a fundamental mode, the first waveguide core extending away from the input surface in a light propagation direction and terminating at a coupling region;
a second waveguide core having a first end at the coupling region and a second end at a media-facing surface that is opposed to the input surface, the first end separated from the termination of the first waveguide core by a gap in the coupling region, the coupling region comprising an overlap between the first and second waveguide cores and configured to promote evanescent coupling between the first and second waveguide cores; and
a mode converter between the input surface and the coupling region, the mode converter converting at least a portion of the light to a higher-order mode, wherein the coupling region prevents a second portion of unconverted light in the fundamental mode from being coupled into the second waveguide core.

16. The apparatus of claim 15, wherein the first and second waveguide cores are phase-matched and have similar mode profiles.

17. The apparatus of claim 15, wherein the first and second waveguide cores are formed of different materials.

18. The apparatus of claim 15, wherein the light is coupled into the first waveguide core in a transverse magnetic mode.

19. The apparatus of claim 15, wherein the light is coupled into the first waveguide core in a transverse electric mode.

* * * * *